United States Patent
Hiskens et al.

(10) Patent No.: US 12,505,514 B2
(45) Date of Patent: Dec. 23, 2025

(54) SYSTEM AND METHOD TO FADE BLENDED IMAGE EDGES

(71) Applicant: Ford Global Technologies, LLC, Dearborn, MI (US)

(72) Inventors: David Hiskens, Ypsilanti, MI (US); Mark Gehrke, Ypsilanti, MI (US); Brian Bennie, Sterling Heights, MI (US)

(*) Notice: Subject to any disclaimer, the term of this patent is extended or adjusted under 35 U.S.C. 154(b) by 367 days.

(21) Appl. No.: 18/166,312

(22) Filed: Feb. 8, 2023

(65) Prior Publication Data
US 2024/0265506 A1  Aug. 8, 2024

(51) Int. Cl.
| | |
|---|---|
| G06T 5/00 | (2024.01) |
| G06T 5/50 | (2006.01) |
| G06T 5/70 | (2024.01) |
| G06T 7/00 | (2017.01) |
| G06V 20/56 | (2022.01) |

(52) U.S. Cl.
CPC .............. G06T 5/70 (2024.01); G06T 5/50 (2013.01); G06T 7/0002 (2013.01); G06V 20/56 (2022.01); G06T 2207/10024 (2013.01); G06T 2207/10048 (2013.01); G06T 2207/20221 (2013.01); G06T 2207/30168 (2013.01); G06T 2207/30252 (2013.01)

(58) Field of Classification Search
CPC .......... G06T 5/70; G06T 5/50; G06T 7/0002; G06T 2207/10024; G06T 2207/10048; G06T 2207/20221; G06T 2207/30168; G06T 2207/30252; G06T 2207/30256; G06V 20/56
See application file for complete search history.

(56) References Cited

U.S. PATENT DOCUMENTS

| | | | |
|---|---|---|---|
| 9,098,922 B2 | 8/2015 | Tico | |
| 9,615,082 B2 | 4/2017 | Sandrew et al. | |
| 10,217,195 B1 | 2/2019 | Agrawal et al. | |
| 10,339,643 B2 | 7/2019 | Tezaur et al. | |

(Continued)

FOREIGN PATENT DOCUMENTS

| | | | | | |
|---|---|---|---|---|---|
| CN | 109636736 A | * | 4/2019 | ............. | G06T 5/007 |
| CN | 114862802 A | * | 8/2022 | | |
| DE | 102010010370 A1 | * | 11/2011 | ............. | H04N 23/20 |

OTHER PUBLICATIONS

Yue et al., "Low-illumination traffic object detection using the saliency region of infrared image masking on infrared-visible fusion image", pub. May 16, 2022., (Year: 2022).*

(Continued)

*Primary Examiner* — Mekonen T Bekele
(74) *Attorney, Agent, or Firm* — Frank Lollo; Eversheds Sutherland (US) LLP

(57) ABSTRACT

A method to enhance image quality is disclosed. The method may include obtaining an infrared image from a vehicle infrared camera. The method may further include multiplying the infrared image with a fade mask, and generating a masked infrared image based on the multiplication. The method may additionally include obtaining a colored image from a vehicle colored camera. Responsive to obtaining the colored image, the method may include combining the masked infrared image with the colored image, and outputting a combined image based on the combination.

20 Claims, 6 Drawing Sheets

(56) References Cited

U.S. PATENT DOCUMENTS

| | | |
|---|---|---|
| 10,783,617 B2 | 9/2020 | Glotzbach et al. |
| 2008/0043041 A2 | 2/2008 | Hedenstroem et al. |
| 2014/0219578 A1* | 8/2014 | Peng .................. H04N 1/58 |
| | | 382/264 |
| 2022/0398693 A1* | 12/2022 | Sasagawa ............. G06T 5/00 |

OTHER PUBLICATIONS

Assaf Zomet et al., Seamless Image Stitching by Minimizing False Edges, IEEE Transaction on Image Processing, vol. 15, No. 4, Apr. 2006, 969-977.

Matthew Uyttendaele et al., Eliminating Ghosting and Exposure Artifacts in Image Mosaics, Dec. 8, 2001, II-509-II-516.

* cited by examiner

SYSTEM AND METHOD TO FADE BLENDED IMAGE EDGES

TECHNICAL FIELD

The present disclosure relates to a vehicle image processing system and method, and more particularly, to a system and method to fade edges of a blended image obtained from a vehicle infrared camera and a vehicle color camera.

BACKGROUND

Many modern vehicles include driver assist systems that may assist drivers in detecting pedestrians and animals in front of the vehicles. For example, a vehicle may have a night vision system that may assist the driver in detecting pedestrians and animals in a specific vehicle range (e.g., 100 meters) during nighttime. The night vision system may output an audio and/or visual notification when the system detects pedestrian/animal in vehicle proximity, thus facilitating the driver in taking appropriate actions (e.g., the driver may decrease vehicle speed or stop vehicle movement).

Vehicle night vision systems typically include infrared cameras that may be configured to detect pedestrians and animals in camera field of view (FOV). However, the infrared camera(s) may not be able to capture all artifacts that may be available in the camera FOV. For example, the infrared camera(s) may not capture illumination state of traffic lights, which may cause inconvenience to the drivers.

Thus, there is a need for a system and method to provide important road or traffic related information available in the camera FOV to the drivers.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
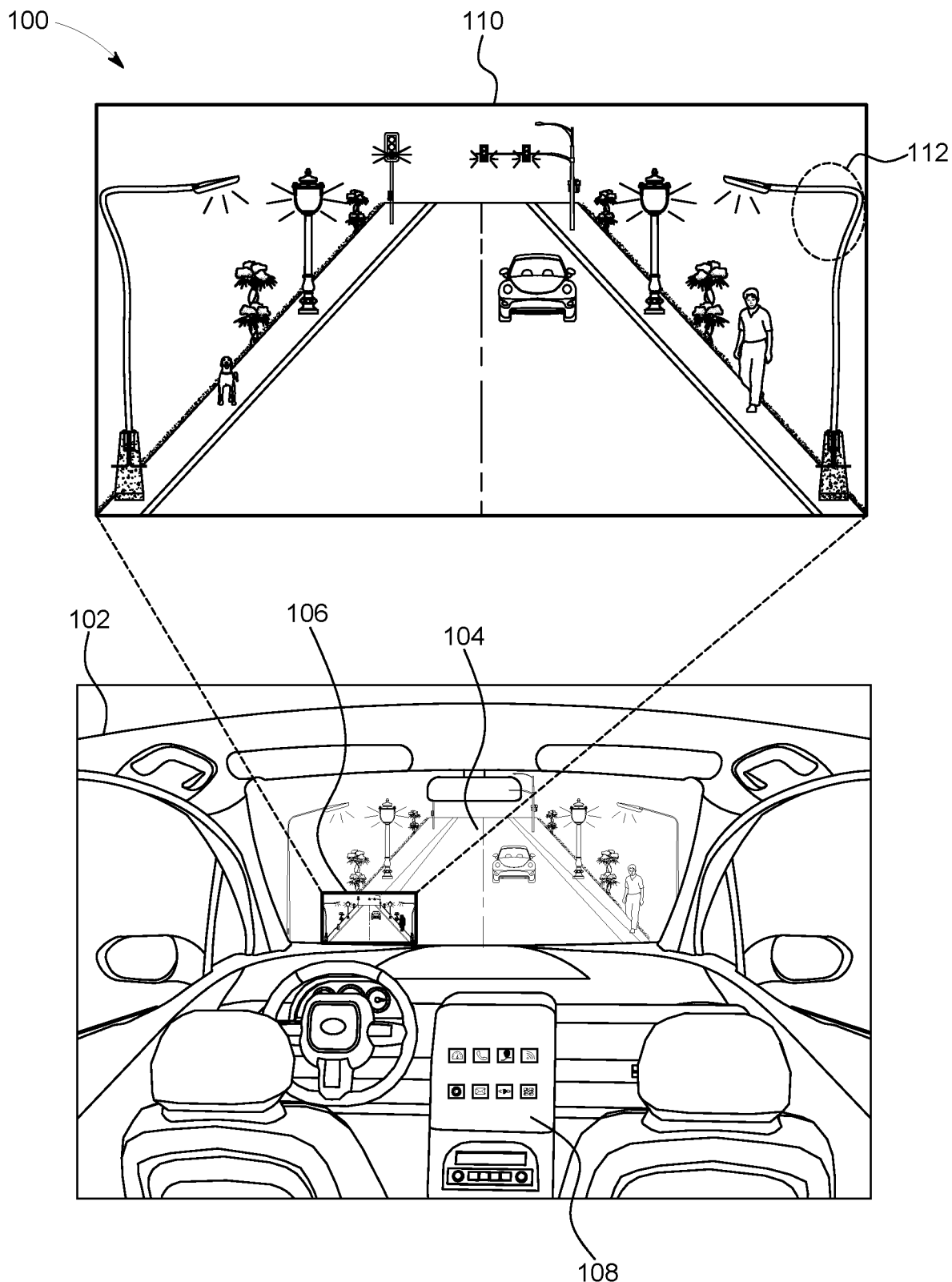
FIG. 1 depicts an example environment in which techniques and structures for providing the systems and methods disclosed herein may be implemented.

The present disclosure describes a driver assist system ("system") that may be configured to assist a driver in detecting pedestrians (or animals) in front of the vehicle when ambient lighting may be dark, e.g., during nighttime. The system may be configured to obtain an infrared image from a vehicle infrared camera. The system may apply a fade mask to the infrared image and generate a masked infrared image. In some aspects, the fade mask may fade infrared image edges or corners. The system may be further configured to obtain a colored image from a vehicle colored camera (e.g., Red-Green-Blue (RGB) camera). Responsive to obtaining the colored image, the system may combine the masked infrared image with the colored image and output a combined or blended image on a vehicle head-up display (HUD) or any other device such as the vehicle infotainment display or cluster display. The blended image may enable the driver to view important color information (e.g., traffic lights, brake lights, etc.) and pedestrians in front of the vehicle. The driver may take appropriate actions (e.g., apply vehicle brakes) when the blended image indicates presence of a pedestrian and/or red colored traffic lights.

The fade masks may be of any configuration or shape. For example, the fade mask may be rectangular or arc-shaped. In some aspects, the system may select an appropriate fade mask from a plurality of fade masks that may be stored in a vehicle memory, to apply to the infrared image. In particular, the system may select the fade mask based on environmental conditions in proximity to the vehicle. For example, the system may obtain vehicle GPS information, and determine that the driver may be driving the vehicle in a city. Responsive to such determination, the system may select a specific fade mask that may be suitable for city environment. Similarly, the system may select fade masks based on ambient lighting condition, time of day, weather condition, and/or the like.

The present disclosure discloses a driver assist system that may display important color information (such as traffic light, brake light, etc.) along with pedestrian information in a single blended image to the driver. The blended image may enable the driver to maneuver vehicle movement based on pedestrian presence and/or traffic light or brake light indication in front of the vehicle. In addition, the system fades the infrared image edges or corners, which removes distortions from the blended image and thus enhances blended image quality. Further, the system maintains important objects (e.g., traffic lights) in the blended image, and fades away objects that may not be important for the driver. In addition, since the fade masks are static in nature, the system is computationally efficient to implement.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 that may take the form of any passenger or commercial vehicle such as, for example, an off-road vehicle, a car, a crossover vehicle, a van, a minivan, a bus, a truck, etc. Further, the vehicle 102 may include any powertrain such as, for example, a gasoline engine, one or more electrically-actuated motor(s), a hybrid system, etc. Furthermore, the vehicle 102 may be a manually driven vehicle and/or be configured and/or programmed to operate in a fully autonomous (e.g., driverless) mode (e.g., Level-5 autonomy) or in one or more partial autonomy modes which may include driver assist technologies. In an exemplary aspect, the vehicle 102 may be travelling on a road network 104 that may include one or more artifacts, for example, traffic lights, lampposts, etc.

The vehicle 102 may include a driver assist system (shown in FIG. 2 as driver assist system 208) that may be configured to assist a vehicle operator (e.g., driver) while driving. In particular, the driver assist system may be configured to detect pedestrians and animals on the road network 104, and alert the vehicle operator so that the vehicle operator may take appropriate actions. For example, the driver assist system may output an audio or visual alert notification or transmit an alert notification to a user device associated with the vehicle operator when the driver assist system detects a pedestrian or an animal on the road network 104 in front of the vehicle 102.

The driver assist system may include one or more units including, but not limited to, an infrared camera or a thermal camera (such as a far infrared camera, not shown), a colored camera (not shown), a heads-up-display (HUD) 106, a processor (shown as processor 244 in FIG. 2), and/or the like. In some aspects, the driver assist system may capture road network 104 images by using the infrared camera and the colored camera and may display the captured images on the HUD 106. Further, the driver assist system may identify pedestrians and animals in the captured images and may highlight them (e.g., via an augmented reality image) in the images displayed on the HUD 106, so that the vehicle operator may take appropriate actions.

The HUD 106 may be a transparent display that may be disposed on a vehicle windshield. The HUD 106 may be disposed on the vehicle windshield in an alignment such that the vehicle operator may easily view the images/data displayed on the HUD 106, without requiring to look away from the road network 104 (e.g., towards a vehicle infotainment display 108). In an exemplary aspect, the HUD 106 may display navigation map (e.g., turn-by-turn signals), real-time road network view with highlighted pedestrians/animals, and/or the like, for driver's assistance while driving. In some aspects, the HUD 106 may be independent of the vehicle windshield. In other aspects, the HUD 106 may be built into or applied onto the vehicle windshield.

Infrared camera(s) may be configured to capture road network images by using infrared radiation. The infrared camera(s) may provide thermal information of objects within a camera frame of view (FOV), including, for example, a heat map figure of a subject (e.g., a pedestrian or an animal) in the camera FOV. The thermal information of objects may assist the vehicle operator in determining presence of subjects on the road network 104 when the vehicle operator may be driving the vehicle 102 during nighttime or when the ambient light may be low.

In some aspects, the infrared camera(s) may be disposed on a vehicle top exterior portion. In other aspects, the thermal infrared camera(s) may be disposed on any other location, e.g., a front bumper, a vehicle grill, etc., and may capture road network images in front of the vehicle 102. Stated another way, the infrared camera(s) may be forward facing camera.

The colored camera may provide a color image data of artifacts and subjects within colored camera FOV. In some aspects, the colored camera may be disposed in a vehicle interior portion. For example, the colored camera may be disposed in proximity to a vehicle rearview mirror. The colored camera may also be configured to capture road network images in front of the vehicle 102. Stated another way, the colored camera too may be forward facing camera, similar to the infrared camera(s).

The processor may be configured to obtain images from both the infrared camera and the colored camera and blend the obtained images to generate a blended image. In particular, the processor may be configured to overlay color information (such as traffic lights, brake lights, signs on the road network 104, etc.) from the image captured by the colored camera on the image captured by the infrared camera to generate the blended image. Thus, the processor may enable the vehicle operator to view important color information in the blended image, which may not be visible in the image captured by the infrared camera. The processor may display the blended image on the HUD 106 (or any other device such as the vehicle infotainment display 108 or cluster display), so that the vehicle operator may view heat figures of subjects (e.g., pedestrians/animals) in front of the vehicle 102 on the road network 104, and important color information (e.g., traffic lights) in a single blended image.

Figure 3A:
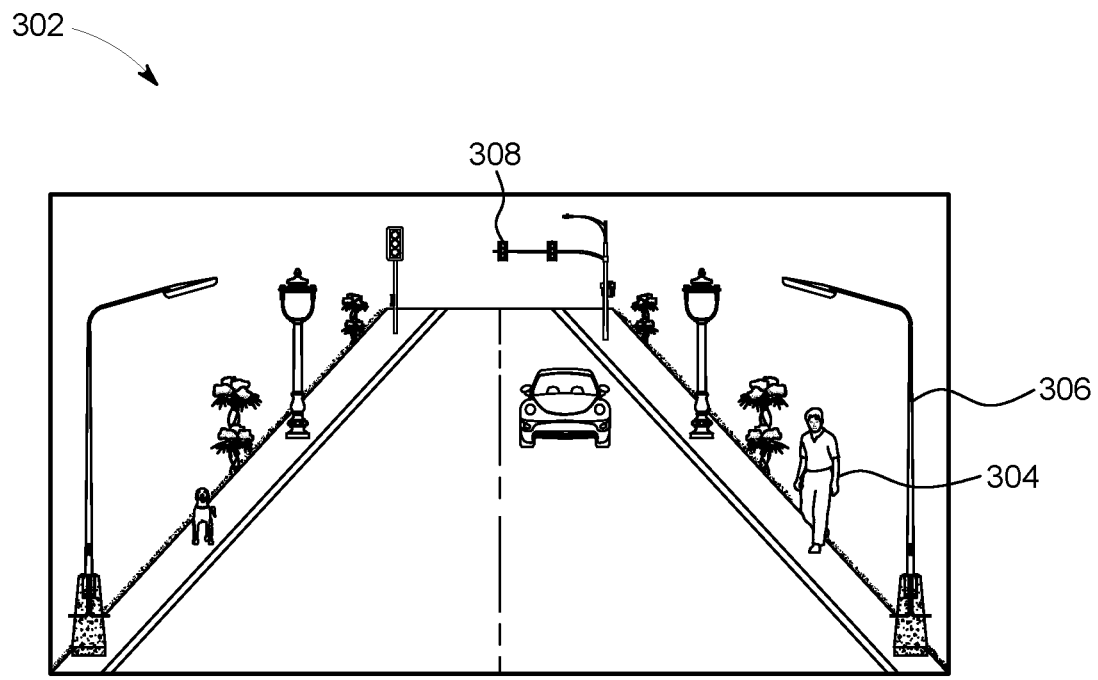
FIGS. 3A-3C depict example image snapshots in accordance with the present disclosure.
Figure 3B:
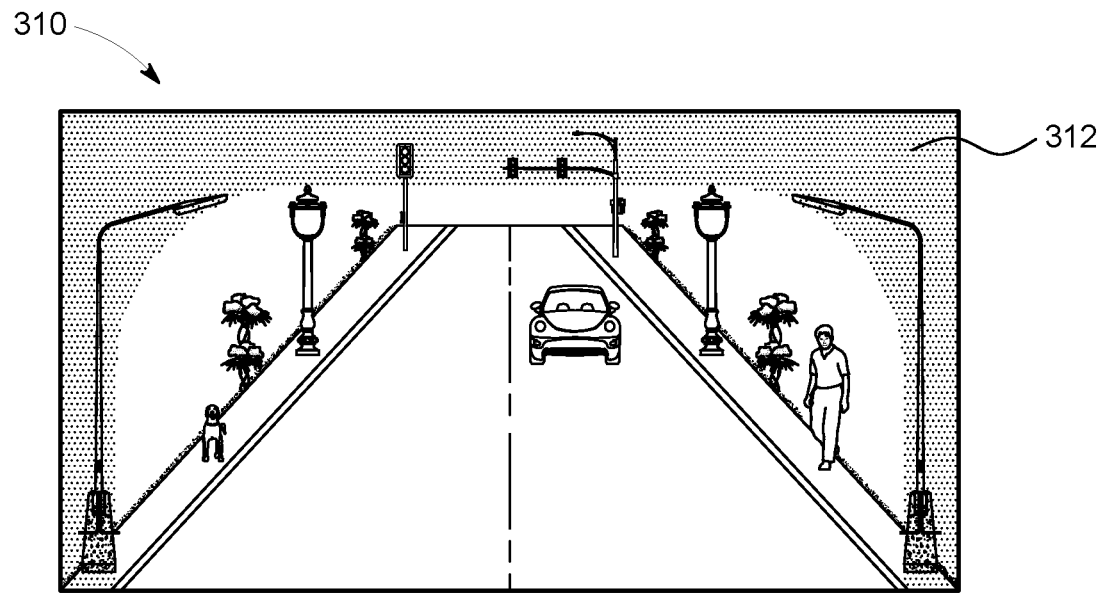
Figure 3C:
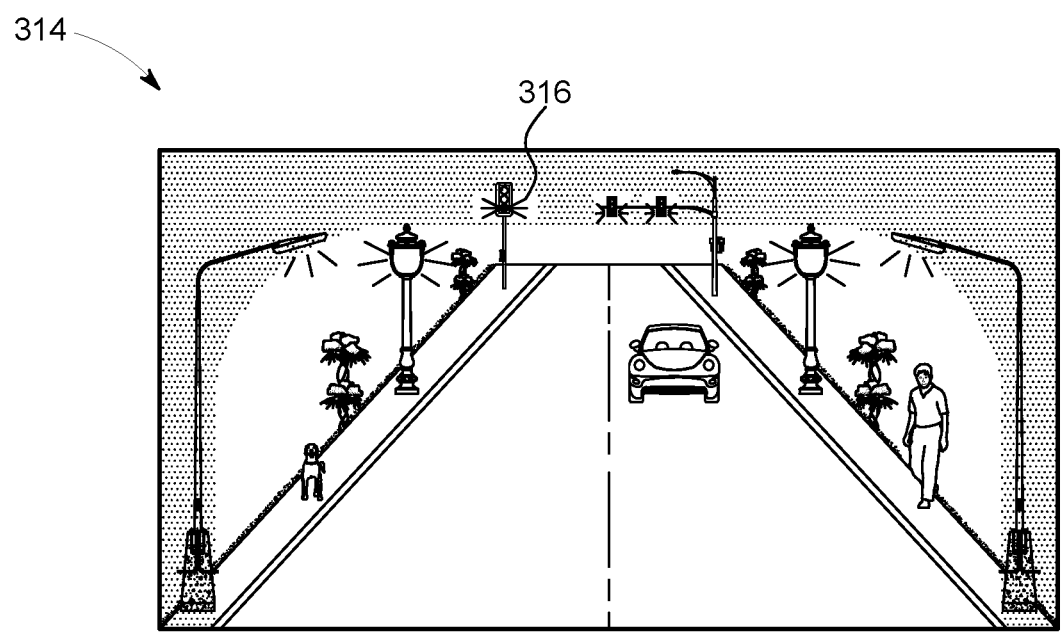

In some aspects, the processor may be further configured to perform image processing on the infrared image captured by the infrared camera, before generating the blended image. The processor may perform image processing to remove parallax that may be present in the images obtained from the infrared camera and the colored camera, thus enhancing quality of blended image. An example blended image with parallax is depicted as view 110 in FIG. 1. As shown in the view 110, artifacts present on the edges or corners of the blended image may be distorted (shown as distortion 112 in the view 110). The distortion 112 may arise at the edges or corners when the processor removes the parallax at the time of combining images from the colored camera and the infrared camera. The processor may further perform image processing on the infrared image before generating the blended image to remove the distortion 112. An example blended image with removed distortion is depicted in FIG. 3C, and described later in the description below.

To remove the distortion, the processor may obtain the infrared image from the infrared camera and apply a fade mask to the infrared image. Stated another way, the processor may multiply the infrared image with the fade mask and generate a masked infrared image based on the multiplication. In some aspects, the processor may perform pixel-wise multiplication of the obtained infrared image with the fade mask to generate the masked infrared image. The fade mask may be of any shape, for example, rectangular, arc-shaped, etc.

A person ordinarily skilled in the art may appreciate that the parallax effect may be more pronounced at blended image edges or corners. Therefore, in an exemplary aspect, the processor may enhance the blended image quality by fading the edges or corners from the obtained infrared image. For example, the processor may multiply pixels in an infrared image middle portion by "1" and pixels in proximity to edges or corners by "0", thus generating an infrared image with faded edges or corners.

The processor may further combine/blend the masked infrared image (with faded edges/corners) with the colored image obtained from the colored camera (which may be unmasked) to generate the blended image with no distortion. The processor may then output or display the blended image on the HUD 106. The blended image that may be formed by using the masked infrared image may be of enhanced quality.

Figure 2:
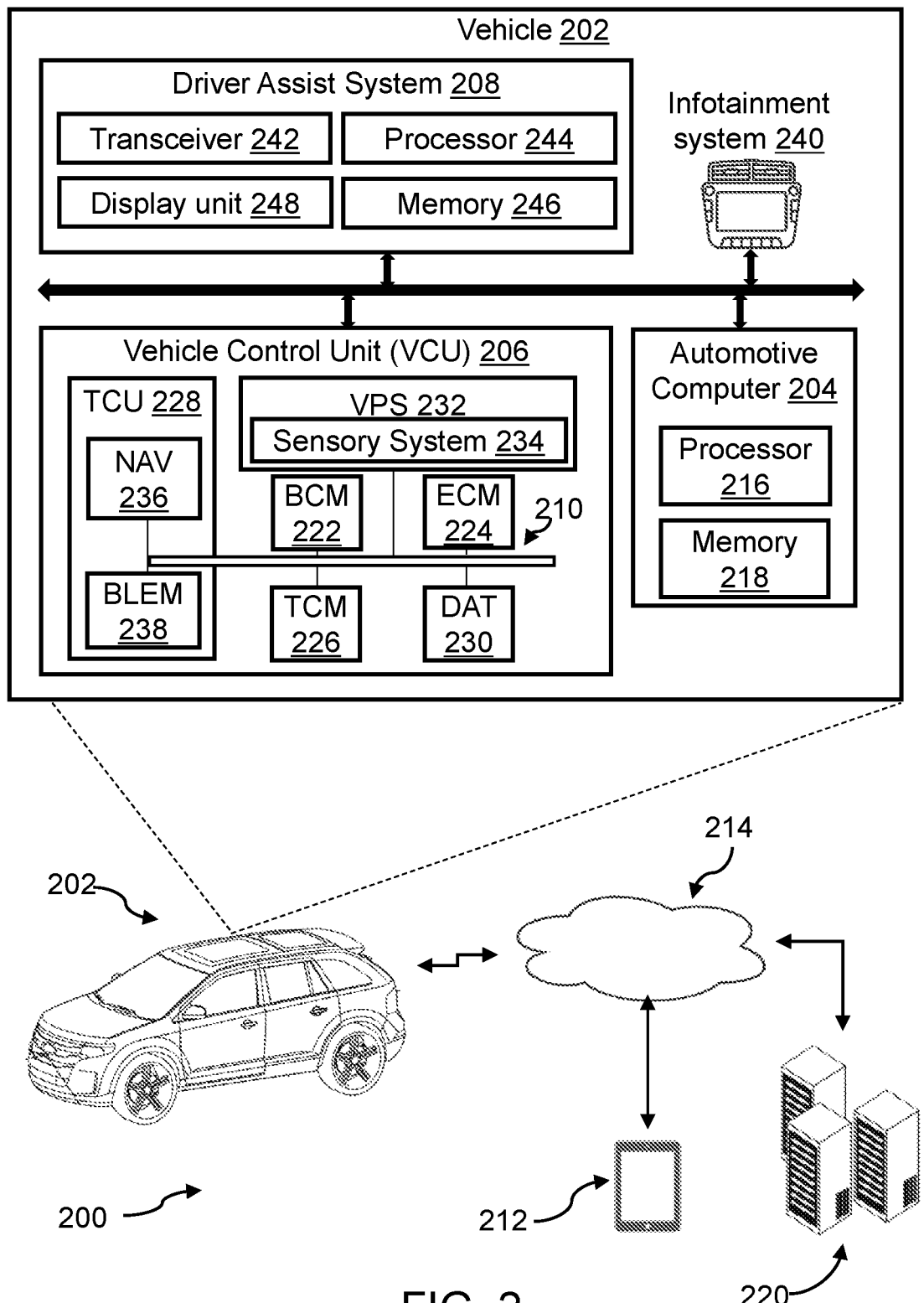
FIG. 2 depicts a block diagram of an example system to enhance image quality, in accordance with the present disclosure.

FIG. 2 depicts a block diagram of an example system 200 to enhance image quality, in accordance with the present disclosure. While describing FIG. 2, references may be made to FIGS. 3A-3C and FIGS. 4A-4D. In particular, FIGS. 3A-3C depict example image snapshots in accordance with the present disclosure, and FIGS. 4A-4D depict example fade masks in accordance with the present disclosure.

The system 200 may include a vehicle 202 that may be same as the vehicle 102. The vehicle 202 may include an automotive computer 204, a Vehicle Control Unit (VCU) 206, and a driver assist system 208 (same as the driver assist system described in conjunction with FIG. 1). The VCU 206 may include a plurality of Electronic Control Units (ECUs) 210 disposed in communication with the automotive computer 204 and the driver assist system 208.

The system 200 may further include a mobile device 212 that may connect with the automotive computer 204 and/or the driver assist system 208 by using wired and/or wireless communication protocols and transceivers. In some aspects, the mobile device 212 may be associated with a vehicle user/operator (not shown in FIG. 2). The mobile device 212 may communicatively couple with the vehicle 202 via one or more network(s) 214, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The network(s) 214 illustrates an example communication infrastructure in which the connected devices discussed in various embodiments of this disclosure may communicate. The network(s) 214 may be and/or include the Internet, a private network, public network or other configuration that operates using any one or more known communication protocols such as, for example, transmission control protocol/Internet protocol (TCP/IP), Bluetooth®, BLE® , Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or some components of the driver assist system 208 may be installed in a vehicle engine compartment (or elsewhere in the vehicle 202), in accordance with the disclosure. Further, the automotive computer 204 may operate as a functional part of the driver assist system 208. The automotive computer 204 may be or include an electronic vehicle controller, having one or more processor(s) 216 and a memory 218. Moreover, the driver assist system 208 may be separate from the automotive computer 204 (as shown in FIG. 2) or may be integrated as part of the automotive computer 204.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable memory storing a driver assist program code. The memory 218 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the automotive computer 204 and/or the driver assist system 208 may be disposed in communication with one or more server(s) 220, and the mobile device 212. The server(s) 220 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 220 may also store fade masks to enhance the blended image quality (as described in conjunction with FIG. 1).

In accordance with some aspects, the VCU 206 may share a power bus with the automotive computer 204, and may be configured and/or programmed to coordinate the data between vehicle 202 systems, connected servers (e.g., the server(s) 220), and other vehicles (not shown in FIG. 2) operating as part of a vehicle fleet. The VCU 206 can include or communicate with any combination of the ECUs 210, such as, for example, a Body Control Module (BCM) 222, an Engine Control Module (ECM) 224, a Transmission Control Module (TCM) 226, a telematics control unit (TCU) 228, a Driver Assistances Technologies (DAT) controller 230, etc. The VCU 206 may further include and/or communicate with a Vehicle Perception System (VPS) 232, having connectivity with and/or control of one or more vehicle sensory system(s) 234. The vehicle sensory system 234 may include one or more vehicle sensors including, but not limited to, a Radio Detection and Ranging (RADAR or "radar") sensor configured for detection and localization of objects inside and outside the vehicle 202 using radio waves, sitting area buckle sensors, sitting area sensors, a Light Detecting and Ranging (LiDAR or "lidar") sensor, environment sensors, light sensors, temperature sensors, etc.

In some aspects, the VCU 206 may control vehicle operational aspects and implement one or more instruction sets received from the mobile device 212, from one or more instruction sets stored in computer memory 218 of the automotive computer 204, including instructions operational as part of the driver assist system 208.

The TCU 228 can be configured and/or programmed to provide vehicle computing connectivity to wireless computing systems onboard and off board the vehicle 202, and may include a Navigation (NAV) receiver 236 for receiving and processing a GPS signal, a BLE® Module (BLEM) 238, a Wi-Fi transceiver, a UWB transceiver, and/or other wireless transceivers (not shown in FIG. 2) that may be configurable for wireless communication between the vehicle 202 and other systems (e.g., a vehicle key fob, not shown in FIG. 2), computers, and modules. The TCU 228 may be disposed in communication with the ECUs 210 by way of a bus.

In one aspect, the ECUs 210 may control aspects of vehicle operation and communication using inputs from human drivers, inputs from an autonomous vehicle controller, the driver assist system 208, and/or via wireless signal inputs received via the wireless connection(s) from other connected devices, such as the mobile device 212, the server(s) 220, among others.

The BCM 222 generally includes integration of sensors, vehicle performance indicators, and variable reactors associated with vehicle systems, and may include processor-based power distribution circuitry that can control functions associated with the vehicle body such as lights, windows, security, camera(s), audio system(s), speakers, door locks and access control, vehicle energy management, and various comfort controls. The BCM 222 may also operate as a gateway for bus and network interfaces to interact with remote ECUs (not shown in FIG. 2).

In some aspects, the DAT controller 230 may provide Level-1 through Level-3 automated driving and driver assistance functionality that can include, for example, active parking assistance, trailer backup assistance, adaptive cruise control, lane keeping, and/or driver status monitoring, among other features. The DAT controller 230 may also provide aspects of user and environmental inputs usable for user authentication.

In some aspects, the automotive computer 204 may connect with an infotainment system 240 (which may be same as the vehicle infotainment display 108) that may include a touchscreen interface portion, and may include voice recognition features, biometric identification capabilities that can identify users based on facial recognition, voice recognition, fingerprint identification, or other biological identification means. In other aspects, the infotainment system 240 may be further configured to receive user instructions via the touchscreen interface portion, and/or display notifications, navigation maps, blended images captured from vehicle infrared and colored cameras, etc. on the touchscreen interface portion.

The computing system architecture of the automotive computer 204, the VCU 206, and/or the driver assist system 208 may omit certain computing modules. It should be readily understood that the computing environment depicted in FIG. 2 is an example of a possible implementation according to the present disclosure, and thus, it should not be considered limiting or exclusive.

In accordance with some aspects, the driver assist system 208 may be integrated with and/or executed as part of the ECUs 210. The driver assist system 208, regardless of whether it is integrated with the automotive computer 204 or the ECUs 210, or whether it operates as an independent computing system in the vehicle 202, may include a transceiver 242, a processor 244, a computer-readable memory 246, a display unit 248 (same as the HUD 106 of FIG. 1), the infrared camera or thermal camera, and the colored camera (described in conjunction with FIG. 1, not shown in FIG. 2). The transceiver 242 may be configured to receive information/inputs from external devices or systems, e.g., the mobile device 212, the server 220, and/or the like. Further, the transceiver 242 may transmit notifications (e.g., alert/alarm signals, pedestrian or animal detection information, etc.) to the external devices or systems. For example, the transceiver 242 may transmit an alert notification to the mobile device 212 when the driver assist system 208 detects a pedestrian or an animal in the images captured by the infrared camera and/or the colored camera, as described in conjunction with FIG. 1.

The processor 244 and the memory 246 may be same as or similar to the processor 216 and the memory 218, respectively. Specifically, the processor 244 may utilize the memory 246 to store programs in code and/or to store data for performing aspects in accordance with the disclosure. The memory 246 may be a non-transitory computer-readable memory storing the driver assist program code. In addition, the memory 246 may be configured to store a plurality of fade masks.

In some aspects, the processor 244 may be an Artificial Intelligence (AI)-based processor that may use a neural network model (not shown) to execute driver assist system operation. The neural network model may be stored in the memory 246. The neural network model may be a trained or unsupervised neural network model that may analyze environment around the vehicle 202, and may select a fade mask to enhance blended image quality. The details of fade mask selection process are described later in the description below.

In one or more aspects, the neural network model may include electronic data, which may be implemented, for example, as a software component, and may rely on code databases, libraries, scripts, or other logic or instructions for execution of a neural network algorithm by the processor 244. The neural network model may be implemented as code and routines configured to enable a computing device, such as the driver assist system 208, to perform one or more operations. In some aspects, the neural network model may be implemented using hardware including a processor, a microprocessor, a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

As described in conjunction with FIG. 1, the processor 244 may be configured to obtain an infrared image captured by the infrared camera (or the thermal camera) that may be mounted on the vehicle top exterior portion. The infrared camera may capture the road network 104 image that may be located in front of the vehicle 202. An example infrared image captured by the infrared camera is shown in FIG. 3A. In particular, FIG. 3A depicts an infrared image 302 captured by the infrared camera. The infrared image 302 depicts presence of a pedestrian 304 and one or more artifacts, e.g., lampposts 306, traffic lights 308, etc.

Responsive to obtaining the infrared image 302, the processor 244 may obtain a fade mask from the memory 246 (or the server 220 via the transceiver 242). In some aspects, the fade mask may be pre-selected and stored in the memory 246 by the vehicle operator. Responsive to obtaining the fade mask from the memory 246, the processor 244 may apply the fade mask to the infrared image 302. In particular, the processor 244 may multiply the fade mask with the infrared image 302, and generate a masked infrared image. The processor 244 may generate the masked infrared image such that infrared image 302 areas that may be important and least susceptible to parallax/distortion (generally near an image middle portion) remain unchanged, and areas that are relatively less important and more susceptible to parallax/distortion (generally near image edges or corners) may be suppressed. An example masked infrared image is shown as an image 310 in FIG. 3B.

FIG. 3B depicts a fade mask 312 that may be applied to the infrared image 302. As shown in FIG. 3B, the fade mask 312 may mask infrared image 302 edges or corners, and generate masked infrared image 310. Stated another way, the fade mask 312 may maintain infrared image 302 middle portion unchanged, and may fade infrared image 302 edges or corners. In some aspects, the fade mask 312 may have a sharp cutoff, where all mask values are either 1 or 0. In other aspects, the fade mask 312 may have soft cutoff, where the mask values smoothly transition from 0 to 1. Further, the fade mask 312 may be static in nature, and may be of any configuration. Different example configurations and shapes of the fade mask 312 are shown in FIGS. 4A-4D, and described later in the description below.

Responsive to generating the masked infrared image 310, the processor 244 may obtain a colored image from the colored camera. The colored image too may be of the road network 104 in front of the vehicle 202. The processor 244 may then combine/blend the masked infrared image 310 with the colored image obtained from the colored camera to generate a blended image. In particular, the processor 244 may overlay color information from the colored image to the masked infrared image 310 to generate the blended image. The overlaying of color information from the colored image may enable the vehicle operator to see important information, such as traffic lights, vehicle brake lights, and/or the like, on the blended image (which may not be visible in the masked infrared image 310). An example blended image is shown as a blended image 314 in FIG. 3C. As shown in the blended image 314, illuminated traffic lights 316 (or lampposts) may be visible in the blended image 314 (and may not be visible in the masked infrared image 310).

Responsive to generating the blended image 314, the processor 244 may output the blended image 314 on the display unit 248, so that the vehicle operator may view the blended image 314 and take appropriate actions (e.g., stop vehicle 202 movement when the traffic lights are illuminated in red color).

Figure 4A:
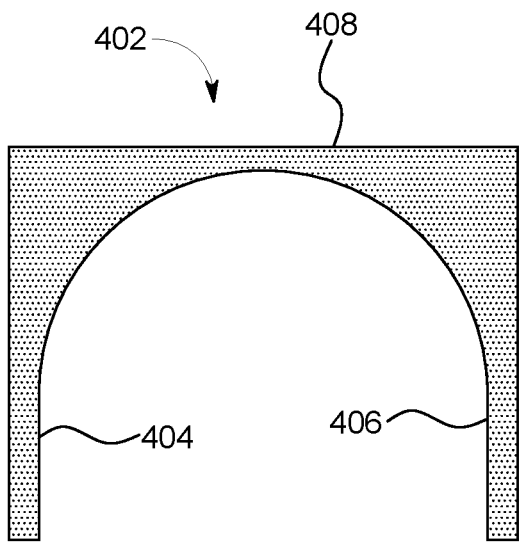
FIGS. 4A-4D depict example fade masks in accordance with the present disclosure.

As described above, FIGS. 4A-4D depict different configurations or shapes of the fade mask 312. For example, FIG. 4A depicts an arc-shaped fade mask 402. In particular, the arc-shaped fade mask 402 may be configured to mask three edges of the infrared image 302 (e.g., left edge 404, right edge 406, and top edge 408). The top edge 408 may be arc-shaped, and the left edge 404 and right edge 406 may be straight. In some aspects, top edge 408 thickness may be greater than thickness of the left edge 404 and the right edge 406. In further aspects, left edge 404 thickness may be same as right edge 406 thickness.

Figure 4B:
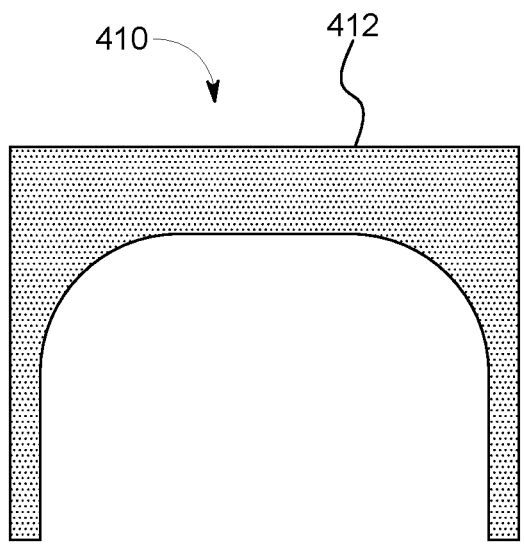

FIG. 4B depicts another example arc-shaped fade mask 410. In the arc-shaped fade mask 410, top edge 412 may be less curved relative to the top edge 408. Further, top edge 412 thickness may be greater than the top edge 408 thickness. Stated another way, the arc-shaped fade mask 410 may be configured to mask more image portion relative to the arc-shaped fade mask 402.

Figure 4C:
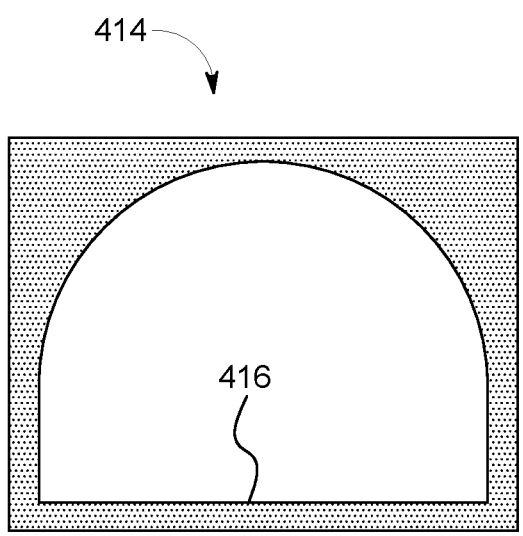

FIG. 4C depicts yet another example arc-shaped fade mask 414. The arc-shaped fade mask 414 may be similar to the arc-shaped fade mask 402. The arc-shaped fade mask 414 may be further configured to mask a bottom edge 416 of the infrared image 302. In some aspects, bottom edge 416 thickness may be same as the thickness of the left edge 404 and the right edge 406. In other aspects, the bottom edge 416 thickness may be different from the thickness of the left edge 404 and the right edge 406.

Figure 4D:
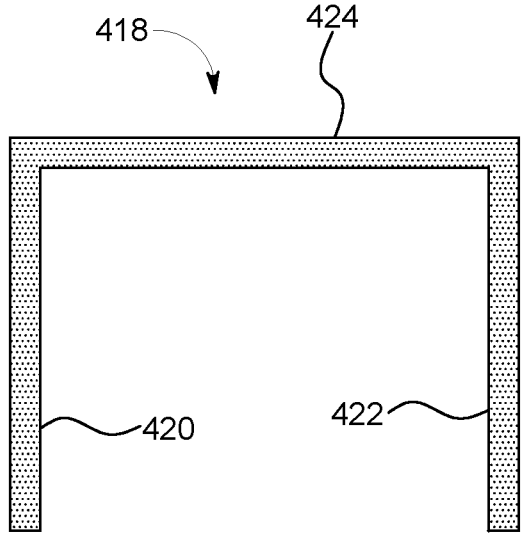

FIG. 4D depicts an example rectangular fade mask 418. The rectangular fade mask 418 may be configured to mask left edge 420, right edge 422 and top edge 424 of the infrared image 302. In some aspects, the rectangular fade mask 418 may be configured to mask all the edges. In some aspects, thickness of all the edges to be masked may be same. Alternatively, edge thickness may be different from each other.

Configurations or shapes of fade masks depicted in FIGS. 4A-4D are exemplary in nature and should not be construed as limited the present disclosure scope. Other fade mask configurations/shapes are within the scope of the present disclosure.

In some aspects, the processor 244 may be configured to select a fade mask of any configuration from the memory 246. In particular, the processor 244 may access the plurality of fade masks stored in the memory 246 or the server 220 (via the transceiver 242), and may select a fade mask to apply to the infrared image 302 based on environment information in proximity to the vehicle 202. The environment information may include, for example, weather information, vehicle geolocation information, time of day information, and environmental light information.

For example, the processor 244 may obtain vehicle 202 geolocation information from the TCU 228 and may determine vehicle 202 GPS location. Responsive to determining the vehicle 202 GPS location, the processor 244 may determine whether the vehicle 202 is in a city, a village or a town. Based on the determined vehicle 202 GPS location, the processor 244 may identify an appropriate fade mask (e.g., by using the neural network model stored in the memory 246) to be applied to the infrared image 302, and fetch the identified fade mask from the memory 246 or the server 220. For example, the processor 244 may fetch and apply the fade mask 402 to the infrared image 302 when the processor 244 determines that the vehicle 202 may be in a city based on the vehicle 202 GPS location.

Similarly, the processor 244 may obtain the environmental light information from environment sensors included in the vehicle sensory system 234, and select an appropriate fade mask based on the environmental light information. For example, the processor 244 may select the fade mask 418 when the environmental light information indicates fog or dark ambient environment. Similarly, the processor 244 may obtain time of the day, and may determine that the vehicle operator may be driving the vehicle 202 during nighttime. Responsive to a determination that the vehicle 202 may be travelling during nighttime, the processor 244 may select the fade mask 402 or the fade mask 414.

Figure 5:
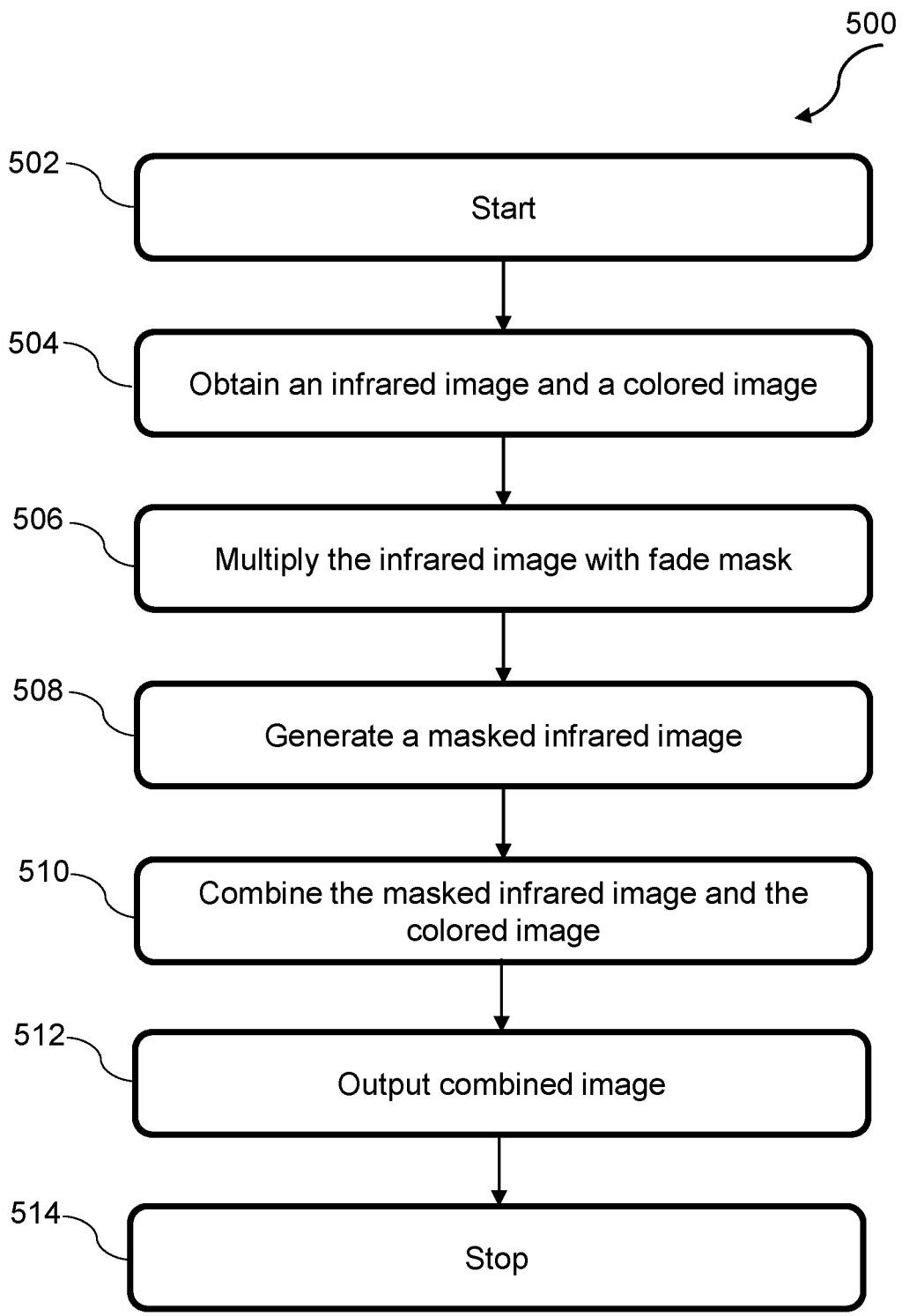
FIG. 5 depicts a flow diagram of an example method for enhancing image quality, in accordance with the present disclosure.

FIG. 5 depicts a flow diagram of an example method 500 for enhancing image quality in accordance with the present disclosure. FIG. 5 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 5, at step 502, the method 500 may commence. At step 504, the method 500 may include obtaining, by the processor 244, an infrared image from the infrared camera and a colored image from the colored camera. In some aspects, the processor 244 may obtain the infrared image and the colored image simultaneously or sequentially in any order. For example, the processor 244 may obtain the infrared image first and the colored image later, or vice versa.

At step 506, the method 500 may include multiplying, by the processor 244, the infrared image with a fade mask. The fade mask may be configured to fade the infrared image edges or corners, as described above in conjunction with FIG. 2. In particular, the processor 244 may select any fade mask shown in FIGS. 4A-4D. In some aspects, the processor 244 may obtain environment information, and select an appropriate fade mask based on the environment information, as described above. At step 508, the method 500 may include generating, by the processor 244, a masked infrared image by multiplying the infrared image with the fade mask.

At step 510, the method 500 may include combining, by the processor 244, the masked infrared image with the colored image (e.g., an unmasked colored image). In particular, the processor 244 may overlay color information from the colored image on the masked infrared image. In some aspects, the processor 244 may additionally perform image processing to remove parallax when the processor 244 combines the images from the colored camera and the infrared camera. Next, at step 512, the method 500 may include outputting, by the processor 244, a combined/blended image responsive to combining the masked infrared image with the colored image. In some aspects, the processor 244 may display the combined/blended image on the display unit 248.

The method 500 stops at step 514.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may" unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to enhance image quality comprising:
   obtaining, by a processor, an infrared image from a vehicle infrared camera associated with a vehicle;
   selecting a fade mask, from among a plurality of pre-stored fade masks, based on environment information in a proximity of the vehicle;
   multiplying, by the processor, the infrared image with the fade mask;
   generating, by the processor, a masked infrared image based on the multiplication;
   obtaining a color image from a vehicle color camera;
   combining the masked infrared image with the color image to generate a combined image; and
   outputting the combined image.

2. The method of claim 1, wherein the vehicle colored camera is disposed in proximity to a vehicle rearview mirror.

3. The method of claim 1, wherein the vehicle infrared camera is disposed on a vehicle top exterior portion.

4. The method of claim 1, wherein the fade mask is rectangular or arc-shaped.

5. The method of claim 1, wherein the fade mask is static.

6. The method of claim 1, wherein selecting the fade mask further comprising:
   receiving an input from a vehicle sensor; and
   determining the environment information based on the input.

7. The method of claim 6, wherein the vehicle environment information comprises at least one of: weather information, vehicle geolocation information, time of day information, and environmental light information.

8. The method of claim 1, wherein the fade mask fades infrared image edges.

9. The method of claim 1, wherein in the combined image:
a first portion of the color image disposed within the masked infrared image is visible; and
a second portion of the color image disposed within the masked infrared image is not visible.

10. A system to enhance image quality comprising:
a processor; and
a memory for storing executable instructions, the processor programmed to execute the instructions to:
obtain an infrared image from a vehicle infrared camera of a vehicle;
select a fade mask, from among a plurality of fade masks, based on vehicle environment information in a proximity of the vehicle;
multiply the infrared image with a fade mask;
generate a masked infrared image based on the multiplication;
obtain a color image from a color camera of the vehicle;
combine the color image with the masked infrared image to generate a combined image; and
output the combined image.

11. The system of claim 10, wherein the color camera is disposed in proximity to a vehicle rearview mirror.

12. The system of claim 10, wherein the vehicle infrared camera is disposed on a vehicle top exterior portion.

13. The system of claim 10, wherein the fade mask is rectangular or arc-shaped.

14. The system of claim 10, wherein the fade mask is static.

15. The system of claim 10, wherein the processor is further configured to:
receive an input from a sensor of the vehicle; and
determine the vehicle environment information based on the input.

16. The system of claim 15, wherein the vehicle environment information comprises at least one of: weather information, vehicle geolocation information, time of day information, and environmental light information.

17. The system of claim 10, wherein the fade mask fades infrared image edges.

18. The system of claim 10, wherein fade mask is pre-stored in the memory and wherein in the combined image:
a first portion of the color image within the masked infrared image is visible; and
a second portion of the color image within the masked infrared image is not visible.

19. A non-transitory computer-readable storage medium having instructions stored thereupon which, when executed by a processor, cause the processor to:
obtain an infrared image from a vehicle infrared camera of a vehicle;
select a fade mask, from among a plurality of fade masks, based on environmental conditions in a proximity of the vehicle;
multiply the infrared image with the fade mask to generate a masked infrared image;
obtain a color image from a color camera of the vehicle;
combine the color image and the masked infrared image to generate a blended image; and
output the blended image.

20. The non-transitory computer-readable storage medium of claim 19, wherein in the combined image:
a first portion of the color image within the masked infrared image is visible, wherein the first portion includes at least one traffic signal; and
a second portion of the color image within the masked infrared image is not visible.

* * * * *